July 23, 1946.　　　　　J. G. OETZEL　　　　　2,404,397
PRESSURE ACTUATED BRAKE MECHANISM
Filed Nov. 6, 1944　　　　2 Sheets-Sheet 1
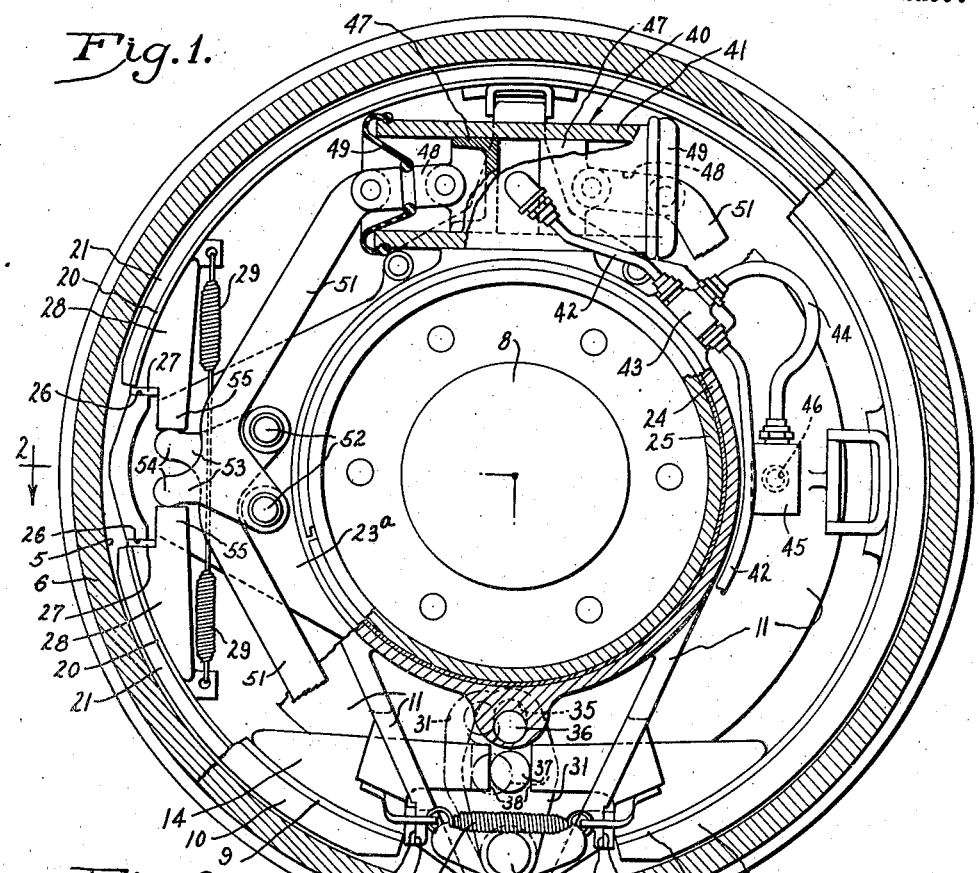
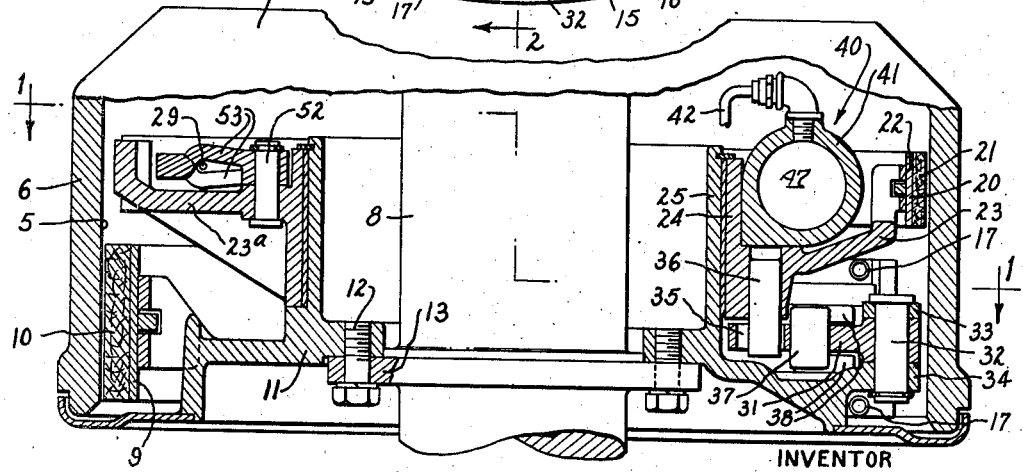
INVENTOR
John George Oetzel
BY
ATTORNEYS July 23, 1946.  J. G. OETZEL  2,404,397
PRESSURE ACTUATED BRAKE MECHANISM
Filed Nov. 6, 1944  2 Sheets-Sheet 2

INVENTOR
John George Oetzel
ATTORNEYS

Patented July 23, 1946

2,404,397

UNITED STATES PATENT OFFICE 2,404,397

PRESSURE ACTUATED BRAKE MECHANISM

John George Oetzel, Beloit, Wis., assignor to Warner Electric Brake Manufacturing Company, South Beloit, Ill., a corporation of Illinois Application November 6, 1944, Serial No. 562,118

8 Claims. (Cl. 188—141)

This invention relates to a brake mechanism of the internally expandable type energized in response to fluid pressure changes.

One object is to provide a brake mechanism of this character by which a substantially greater retarding torque is obtainable than in prior mechanisms of the same type.

A more detailed object is to augment the fluid pressure source applied to a main brake element through the intermediary of an auxiliary friction element.

The invention also resides in the novel manner of mounting the fluid pressure actuator so that its available force may be utilized to best mechanical advantage.

Other objects and advantages of the invention will become apparent from the following detailed description taken in connection with the accompanying drawings, in which Figure 1 is an end view partially in section of a brake mechanism embodying the novel features of the present invention, the section being taken along the line 1—1 of Fig. 2.

Fig. 2 is a section taken along the line 2—2 of Fig. 1.

Figure 3:
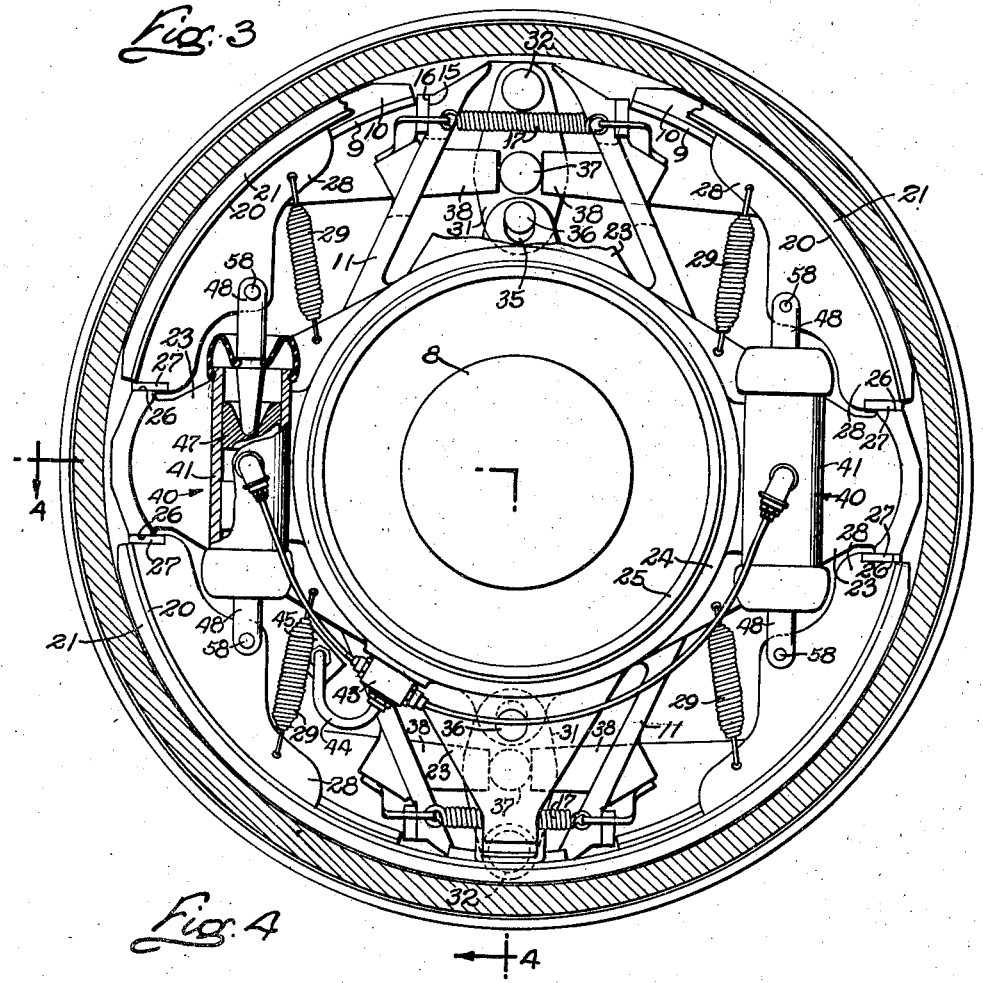
Figure 4:
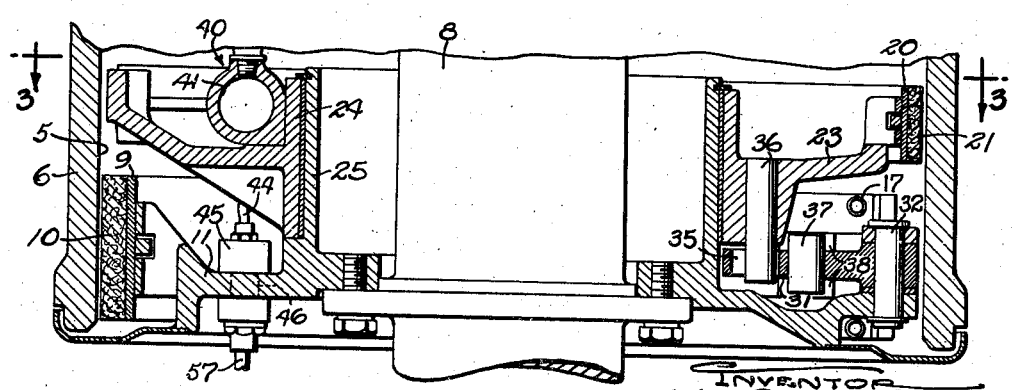

Figs. 3 and 4 are views similar to Figs. 1 and 2 showing a modified form of the invention, the sections being taken along the lines 3—3 and 4—4 of Figs. 4 and 3 respectively.

The brake mechanisms shown for purposes of illustration are adapted for expansion of their friction elements into gripping engagement with the internal cylindrical surface 5 of a drum 6 having an inturned flange 7 which may be mounted in the usual way on a vehicle wheel or other rotary part whose motion is to be controlled. In this instance, the drum and the vehicle wheel rotate about a stationary axle 8 projecting axially through the drum.

The mechanism shown in Figs. 1 and 2 is especially adapted for the use of air as the actuating fluid. This mechanism includes a main friction element adapted for expansion against the zone of the surface 5 near the open end of the drum. The element is composed of two semi-circular shoes 9 covered with friction material 10 and arranged in end-to-end relation with their ends spaced apart on diametrically opposite sides of the drum. The shoes are supported by an anchor member in the form of a casting 11 fastened by bolts 12 to a flange 13 on the axle 8 and substantially closing the open end of the drum. Brackets 14 welded to the inner sides of the shoe ends provide abutment surfaces 15 engageable with abutments 16 on the anchor member 11. Contractile springs 17 stretched between the shoe brackets 14 normally maintain the main friction element contracted with its shoe surfaces 15 engaging the abutments 16 as shown in Fig. 1, the main brake then being released.

The main friction element is expanded against the drum by a force derived in part from the momentum of the rotating part. This is accomplished through the medium of an auxiliary friction element engageable in this instance with the inner end portion of the drum surface 5 and movable bodily with the rotating drum through an angular distance sufficient to expand the main element. In the present instance, the auxiliary element comprises a pair of semi-circular shoes 20 covered with friction material 21 and arranged in end-to-end relation with their adjacent ends spaced apart and disposed on diametrically opposite sides of the drum but angularly spaced from the ends of the main shoes 9. The shoes 20 are supported on the peripheral surface 22 of a second anchor member 23 whose hub 24 is journaled on the hub 25 of the first or non-rotatable anchor member 11. Outwardly projecting arms 23ª on the second anchor member 23 provide oppositely facing abutments 26 engageable with plates 27 on brackets 28 which are secured along the center line and on the inner surface of the auxiliary shoes 20. Contractile springs 29 normally maintain these shoes contracted against the abutments 26.

When the auxiliary friction shoes 20 are expanded into gripping engagement with the rotating drum, the corresponding ends will anchor on the abutments 26, and the shoes, together with the anchor member 23, will turn bodily with the drum in the direction of rotation of the latter. This motion of the shiftable anchor is multiplied mechanically and applied to the corresponding ends of the main shoes 9 to expand the latter against the drum. For this purpose, crank arms 31 project radially inwardly from pivots 32 which extend between spaced portions 33 and 34 of the main anchor 11 and are disposed adjacent the drum surface 5 between the ends of each pair of main shoe ends. At their inner ends, the crank arms 31 have slots 35 receiving pins 36 which project from the floating anchor 23. Projecting from opposite sides of the crank arms intermediate the ends thereof are pins 37 which are engageable with the ends 38 of the brackets 14 on the main shoes 9, these bracket ends straddling the crank. Thus, one shoe end 38 will be moved away from its anchor 16 as the crank 31 is swung from the brake-released position shown in Fig. 1 to the position shown in phantom. After normal clearance has been taken up, the shoes 9 engage the drum and are held pressed against the latter so long as the auxiliary friction element remains energized. Upon contraction of the latter, the springs 17 contract the main friction element and return the crank arms to released position.

The ends of the auxiliary shoes are spread apart by fluid pressure operators 40 which, in accordance with the present invention, are mounted on the floating anchor member 23 to travel therewith so as to minimize the length of the actuating strokes of the operators. In Figs. 1 and 2, the operators 40 comprise air cylinders 41 angularly spaced around the drum from the shoe ends 28 and secured as by welding to the exterior of the hub 24 on the anchor 23 with the axes of the cylinders parallel to each other and extending along chords of the drum axially spaced inwardly from the cranks 31. Conduits 42 communicate with the centers of the cylinders and lead to a fitting 43 secured to the hub 24 and communicating through a flexible conduit 44 with a fitting 45 on the primary anchor 11. A conduit 46 extends from the latter fitting through the anchor 11 and is connected to a pipe 57 for conveying compressed air to the brake mechanism from a suitable source of supply, the delivered pressure being regulated in the usual way by a suitable valve.

Within each cylinder 41 are two pistons 47 connected to links 48 which project through diaphragms 49 and from opposite ends of the cylinders. The outer ends of those links which project in the same direction from the two cylinders are pivotally connected to the long arms of bell cranks 51 which are fulcrumed on pins 52 circumferentially spaced apart and projecting inwardly from the floating anchor 23 and parallel to the drum axis. The bell cranks have short arms 53 which project outwardly and have rounded ends 54 bearing against the ends 55 of extensions on the brackets 28 of the auxiliary shoes 20. The bell cranks are bent as shown in Fig. 2 to permit of such overlapping.

With the parts disposed in brake-released position shown and the drum turning clockwise, the brake mechanism shown in Figs. 1 and 2 operates in the following manner in response to the admission of pressure fluid to the cylinders 41 through the conduit 44. Both pistons in each cylinder first move outwardly, and, through the medium of the levers 51, move all four of the shoe ends 27 away from the anchor abutments 26. As soon as the shoes engage the drum surface 5, they shift bodily with the drum until their leading ends, as determined by the direction of drum rotation, come against their anchors 26, whereupon the other shoe ends move farther away from their anchors and receive the full actuating force developed by the respective actuators 40. The reverse action takes place when the brake is applied with the drum rotating counterclockwise.

The friction force resulting from engagement of the auxiliary shoes 20 with the drum moves these shoes and their floating anchor 23 in the direction of drum rotation, whereupon the pins 36 swing the crank arms 31 to the position shown in phantom in Fig. 1, thereby moving the corresponding ends 38 of the main shoes 9 away from their anchors 16 so as to expand the main friction element. Inasmuch as the fluid pressure actuators 40 are mounted on the floating anchor 23 to shift therewith, it is unnecessary for the operators 40 to take up the motion incident to actuation of the main shoes. As a result, the fluid actuators may have comparatively short strokes determined by the maximum shoe clearance obtained in service operation between the auxiliary shoes and the drum. When the actuating fluid pressure is relieved, all of the parts are returned to brake released position by the action of the springs 17 and 29.

Figs. 3 and 4 show a modification of the improved brake mechanism adapted for actuation hydraulically. In this form, the main and auxiliary friction elements are mounted and interconnected in the same manner as in the mechanism first described, and the various parts are correspondingly numbered. In this case, however, the cylinders 41 of the hydraulic actuators 40 are smaller in diameter owing to the higher pressures that may be employed, and are disposed immediately adjacent the ends of the auxiliary shoes. The pistons 47 are connected through the links 48 directly to pivot pins 58 on the brackets 28 of the auxiliary shoes 20 so that the piston motions are thus applied directly to spread the ends of the auxiliary shoes 20 apart against the action of the return springs 29 which, in this instance, extend from the brackets 28 to points on the floating anchor 23. The operation of this form of the brake is identical with that of the first form described above.

It will be apparent from the foregoing that the auxiliary friction element which is energized by the pressure actuated devices derives an actuating force from the momentum of the part to be braked which force is applied to the main shoes and in magnitude is many times that of the primary actuating force. Both the main and auxiliary shoes may anchor at either end so that the full lengths of all four shoes are effective in either direction of drum rotation. Therefore, even though the fluid pressure is derived by manual effort, a powerful retarding torque is produced without the necessity of employing large mechanical ratios in the force transmitting connections and with danger of an uncontrollable wrapping action being developed.

This application is a continuation-in-part of my co-pending application Serial No. 448,751, filed June 27, 1942, now abandoned.

I claim as my invention:

1. A brake mechanism having, in combination, two shoes arranged end to end with their pairs of ends spaced apart, an anchor member, abutment anchors for said shoe ends carried by said member, two pairs of bell-cranks respectively supported by circumferentially spaced pivots fixed relative to and carried by said anchor member adjacent said shoe ends, the bell-cranks of each pair having short arms engaging the ends of one pair of shoes and long arms extending circumferentially in opposite directions, two fluid pressure cylinders stationarily mounted with respect to said anchor member, their axes extending parallel to each other between said pairs of shoe ends, two pistons in each of said cylinders respectively connected to two of said long arms, and pressure fluid supply means communicating with the interior of said cylinders between the pistons therein.

2. A brake mechanism having, in combination, two shoes arranged end to end with their pairs of ends spaced apart, an anchor member, abutment anchors for said shoe ends carried by said member and permitting movement of the shoe ends circumferentially away from the anchors, two pairs of levers for actuating the respective shoe ends each pivotally supported by said member, the levers of each pair extending circumferentially in opposite directions, two fluid pressure cylinders stationarily mounted with respect to said member, two pistons in each of said cylinders, and means connecting the pistons in each cylinder to two levers of the different pairs and actuating the levers unidirectionally in response to a pressure increase.

3. A brake mechanism having, in combination, an expensible friction element having ends spaced apart, a member providing an anchor disposed between said ends, two pivot pins carried by said member providing axes which are fixed relative to the member and are disposed inwardly from said ends and circumferentially spaced apart, a bell-crank fulcrumed on one of said pins and having a short arm bearing against one of said ends and a long arm extending across the other of said pins and circumferentially around said drum, a second similar bell-crank fulcrumed on the other of said pins with its short arm bearing against the other of said ends and its long arm extending circumferentially in a direction opposite to that of said first mentioned long arm, two parallel cylinders, and pistons in said cylinders respectively connected to the free ends of said long arms.

4. A brake mechanism having, in combination, an expansible friction element having separable ends, a member providing an anchor disposed between said ends, a bell-crank fulcrumed on said member to turn about an axis which is fixed relative to said member and which is disposed adjacent said shoe ends, said bell-crank having a short arm bearing against one shoe end and a long arm extending circumferentially around said drum, a second similar bell-crank fulcrumed on said member adjacent said shoe ends with its short arm bearing against the other end and its long arm extending circumferentially in a direction opposite to that of said first mentioned long arm, two parallel cylinders fixedly mounted with respect to said member, and pistons in said cylinders respectively connected to the free ends of said long arms.

5. A friction brake mechanism having, in combination, an annular main friction element adapted for expansion of its peripheral surface by circumferential separation of its ends, a non-rotatable member providing an anchor for said element, a ring journaled on said member to turn about the axis of said element, an annular auxiliary radially expansible friction element having separable ends adapted to anchor on said ring, a cylinder rigid with said ring with its axis extending along a chord of said auxiliary friction element, pistons within said cylinder respectively connected to the ends of said auxiliary element to separate the latter upon an increase in the fluid pressure in said cylinder, and means for introducing pressure fluid in said cylinder between said pistons.

6. A friction brake having, in combination, an anchor member adapted to be mounted non-rotatably, a main friction element adapted for radial expansion while anchored on said member, a second anchor member mounted on said first member to turn about the axis of said element in either direction away from a normal brake-released position, a pair of auxiliary friction elements arranged in end-to-end relation and having pairs of separable ends adapted to anchor selectively on said second member, a pair of fluid cylinders rigid with said second anchor member and each having a pair of pistons therein, means connecting said four pistons to the respective ends of said auxiliary friction elements to separate the ends of each pair in response to an increase in the fluid pressure in said cylinders, means for conducting pressure fluid to said cylinders between the pistons therein, and means connecting said second anchor member and said main friction element to expand the latter upon movement of the second member in either direction away from said brake-released position.

7. A friction brake mechanism having, in combination, an anchor member adapted to be mounted non-rotatably, a main friction element of annular form mounted on said member for radial expansion and to anchor on the member, a second anchor member mounted on said first member to turn about the axis thereof in either direction away from a normal brake-released position, an auxiliary radially expansible friction element of annular form anchored on said second member and supported thereby for bodily angular movement therewith about the axis of said first element, a fluid cylinder rigid with said second anchor member and having a piston therein, means connecting said piston and said auxiliary friction element to expand the latter in response to an increase in the fluid pressure in said cylinder, and means connecting said second anchor member and said main friction element to expand the latter upon angular movement of the member in either direction away from said brake-released position.

8. A friction brake mechanism having, in combination, an anchor member adapted to be mounted non-rotatably, a second anchor member mounted on the first member for angular movement about an axis, a main friction element concentric with said axis and adapted for radial expansion while anchored on the member, an auxiliary radially expansible friction element concentric with said axis and anchored on said second member for bodily angular movement therewith, a fluid pressure operator having a cylinder and mounted on said second anchor member for angular movement therewith, means connecting said operator with said auxiliary friction element to expand the latter in response to an increase in the fluid pressure in said cylinder, and means connecting said second anchor member and said main friction element to expand the latter upon movement of the second member in either direction away from said brake-released position.

JOHN GEORGE OETZEL.